(12) United States Patent
Dorisio et al.

(10) Patent No.: US 10,696,482 B2
(45) Date of Patent: Jun. 30, 2020

(54) MODULAR LINK CONVEYOR WITH FEATURES FOR ENHANCING EFFICIENT ARTICLE CONVEYANCE

(71) Applicant: SPAN TECH LLC, Glasgow, KY (US)

(72) Inventors: Andrew D. Dorisio, Lexington, KY (US); James L. Layne, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 16/173,322

(22) Filed: Oct. 29, 2018

(65) Prior Publication Data
US 2019/0135544 A1    May 9, 2019

Related U.S. Application Data

(62) Division of application No. 15/430,979, filed on Feb. 13, 2017, now Pat. No. 10,138,064.

(60) Provisional application No. 62/294,784, filed on Feb. 12, 2016.

(51) Int. Cl.
| | |
|---|---|
| *B65G 17/40* | (2006.01) |
| *B65G 17/08* | (2006.01) |
| *B65G 17/06* | (2006.01) |
| *B65G 17/00* | (2006.01) |

(52) U.S. Cl.
CPC ............ *B65G 17/08* (2013.01); *B65G 17/40* (2013.01)

(58) Field of Classification Search
None
See application file for complete search history.

(56) References Cited

U.S. PATENT DOCUMENTS

| | | | | |
|---|---|---|---|---|
| 7,284,657 | B2 * | 10/2007 | Ulsh ................. | B65G 17/086 198/852 |
| 7,293,644 | B2 * | 11/2007 | Stebnicki ............ | B65G 17/086 198/850 |
| 7,731,020 | B2 * | 6/2010 | Bigler ................. | B65G 17/08 198/699.1 |

\* cited by examiner

*Primary Examiner* — Kavel Singh
(74) *Attorney, Agent, or Firm* — King & Schickli, PLLC

(57) ABSTRACT

An apparatus for conveying an article in a conveying direction is provided. A conveyor includes a plurality of modular links and one or more removable connectors for interconnecting adjacent links of the plurality of modular links to form an endless chain for conveying the article in the conveying direction, at least one of the links comprising an upper link surface sloping in both the conveying direction and a transverse direction, thereby forming an apical region for contacting and supporting the article for conveyance along at least a forward run in the conveying direction.

9 Claims, 6 Drawing Sheets

MODULAR LINK CONVEYOR WITH FEATURES FOR ENHANCING EFFICIENT ARTICLE CONVEYANCE

This application claims the benefit of U.S. application Ser. No. 15/430,979 and Provisional No. 62/294,784, the disclosures of which are incorporated herein by reference.

TECHNICAL FIELD

This disclosure relates to the conveyor arts and, more particularly, to an enhanced conveyor chain adapted for more efficiently conveying articles.

BACKGROUND

Modular link conveyor chains have enjoyed widespread use in the past several decades as an efficient and effective means of transporting articles. One particular common use of such conveyors is in an arrangement where the articles may adhere to the conveying surface, such as in the case of food products being frozen during conveyance. In this type of arrangement, or simply as a matter of a desire for conveyance over a long distance (such as for cooling, drying, etc.) without the need for wasting valuable floor space, it is also common to convey articles using a side-flexing conveyor chain in a spiral configuration (which typically involves driving the chain using sprocket teeth on a rotating central drum, but the drive arrangement may take different forms as well). Regardless of the form of drive, it can be appreciated that driving of the chain along the spiral path with an elevation change requires a significant input of energy, and thus improving efficiency is a matter of significant concern.

Accordingly, there is a need for an improved modular link conveyor that may address any one of these issues or perhaps other different issues that have yet to be identified. The arrangement should be readily adaptable to many different types of conveyors at minimal cost, and potentially applied in a retrofit situation without extensive effort. The arrangement would be especially adapted for use where the articles being conveyed are susceptible to adhering to a flat conveying surface, where there is a need for an efficient transfer of the articles from one conveyor to another, and where it is desirable to maximize heat transfer during conveyance (such as through cooling).

SUMMARY

An apparatus for conveying an article in a conveying direction is provided. The apparatus includes a conveyor with a plurality of modular links and one or more removable connectors for interconnecting adjacent links of the plurality of modular links to form an endless chain for conveying the article in the conveying direction. At least one of the links comprises an upper link surface sloping in both the conveying direction and a transverse direction, thereby forming an apical region for contacting and supporting the article for conveyance along at least a forward run in the conveying direction.

In one embodiment, the conveying surface includes a depressed region on at least one side of the apical region and connected thereby by a gradually sloping surface. The depressed region may be spaced from the apical region in the conveying direction or the transverse direction. The depressed region may surround the apical region.

The conveying surface may be substantially smooth and uninterrupted, or may include one or more openings. At least two links including the apical region are positioned adjacent to each other in a row extending in the transverse direction. The at least two links including the apical region are positioned adjacent to each other in a row extending in the conveying direction. The apical region may include a central plateau of the conveying surface.

A first link in a first row includes the apical region. A second link in a second row interdigitated with the first link and connected to the first link by the removable connector includes a depressed region. The first link includes another apical region, and the depressed region is between the apical regions of the first link. The second link includes at least one apical region.

According to a further aspect of the disclosure, an apparatus for conveying an article in a conveying direction includes a conveyor comprised of a plurality of modular links and one or more removable connectors for interconnecting adjacent links in a row, at least one of the links comprising a link surface including a first upper region for contacting and supporting the article for conveyance along at least a forward run in the conveying direction and a second, lower region adjacent to the first upper region in a direction transverse to the conveying direction for not contacting the article.

The conveying surface includes a third region lower that the first, upper region and located in a transverse direction on a different side of the second, lower region. A projection may be positioned in a space between the first upper region and the second lower region. The projection may be connected to a transfer for transferring articles from the conveyor.

A further aspect of the disclosure pertains to a conveyor link having an upper conveying surface contoured in both a conveying direction and a direction transverse to a conveying direction to form an apical region.

Still a further aspect of the disclosure pertains to a conveyor link having a link surface that includes a first upper region for contacting and supporting an article for conveyance along at least a forward run in a conveying direction and a second, lower region adjacent to the first upper region in a direction transverse to the conveying direction for not contacting the article.

In one embodiment, the link surface includes a third region lower that the first, upper region and located in a transverse direction on a different side of the second, lower region.

Yet a further aspect of the disclosure pertains to an apparatus for conveying an article in a conveying direction. The apparatus includes a conveyor comprised of a plurality of modular links and one or more removable connectors for interconnecting adjacent links to form a row of links, the plurality of interconnected links forming an undulating link surface extending in a transverse direction along the row of links. In one embodiment, the links include apical regions aligned in the transverse direction for contacting and supporting the article for conveyance along at least a forward run in the conveying direction. The link surface of the conveyor may undulate in the conveying direction.

In the following description, there are shown and described several preferred embodiments of a modular link conveyor with features for enhancing efficient article conveyance. As it should be realized, the arrangement is capable of other, different embodiments and its several details are capable of modification in various, obvious aspects all without departing from the modular link conveyor with features for enhancing efficient article conveyance, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the modular link conveyor with features for enhancing efficient article conveyance and, together with the description, serve to explain certain principles thereof. In the drawing figures.

Reference will now be made in detail to the present preferred embodiments of the modular link conveyor with features for enhancing efficient article conveyance, examples of which are illustrated in the accompanying drawing figures.

DETAILED DESCRIPTION

Figure 1:
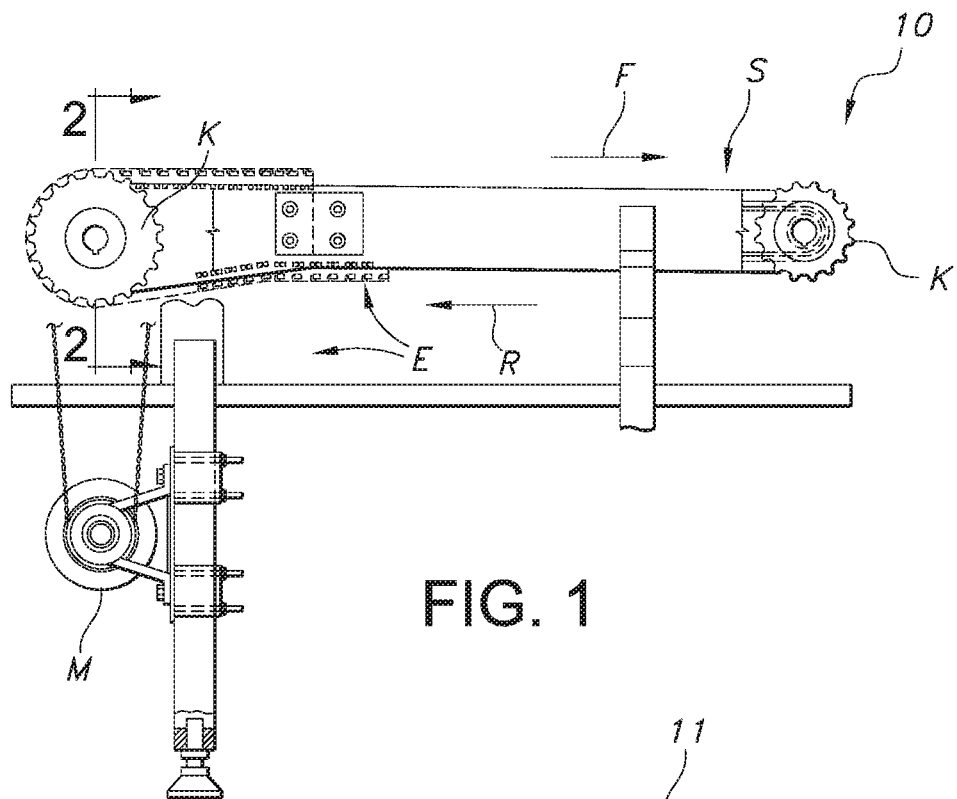
FIG. 1 is a side view of a conveyor system.
Figure 2:
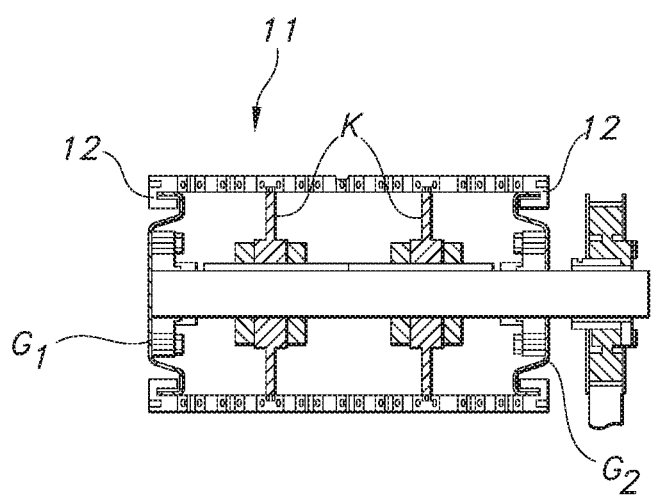
FIG. 2 is a partially cutaway end view of the conveyor system.
Figure 3:
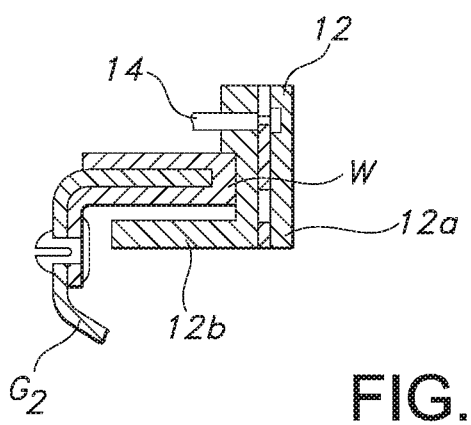
FIG. 3 is a partially cutaway cross-sectional side view of a guide for the conveyor chain.
Figure 4:
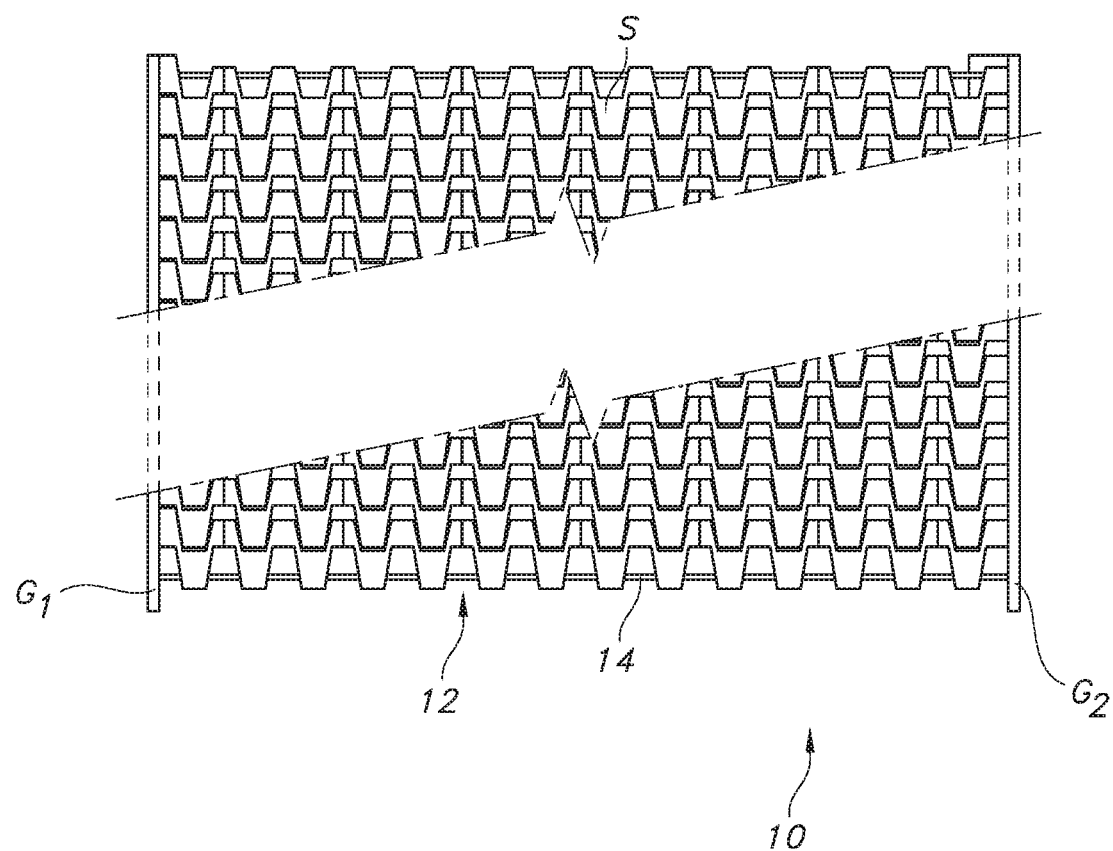
FIG. 4 is a top view of a conveyor chain.

Reference is now made to FIGS. 1-4, which depict one embodiment of a conveyor system 10 adapted for the conveyance of articles, such as in a linear path or along a curved path (including possibly with an elevation change in either case). In this embodiment, the system 10 includes a belt or chain 11 adapted for supporting and conveying objects or articles comprised of a plurality of interconnected modular links 12. The links 12 forming the chain 11 are arranged in rows so as to define a pitch between adjacent rows (that is, the spacing from a location on a link of a first row to a point on a corresponding location on a link of a second row). Each row may include intermediate links sandwiched between specialized side links, which may be adapted (such as by including a depending arm 12a and an inwardly projecting guide tab 12b) to provide a guiding and hold-down function for the chain 11 along spaced guide rails G1, G2 supported by a frame E. As shown in FIG. 3, each guide rail G1 or G2 may optionally include a wear strip W to reduce friction and increase durability.

Adjacent rows of links 12 are connected by transverse connectors 14, which are typically stainless steel rods mounted through matching apertures (e.g., slots and holes) in the adjacent rows and retained by locking tabs. As can be appreciated, this provides the resulting chain 11 with a degree of side-flexing to allow for the more effective negotiation of curves in the system 10 (such as would be present in a spiral conveying configuration). A more detailed description of various examples of such a modular link chain arrangement may be found in U.S. Pat. Nos. 4,953,693 and 5,031,757, the disclosures of which are incorporated herein by reference. However, the present arrangement is not limited to any particular design of modular link chain or conveyor system 10, as the features described herein may find utility in various applications.

In this particular application, the chain 11 is shown as being arranged to travel in an endless conveying path with a conveying surface S for supporting objects along a forward run F. In the illustrated embodiment, the conveyor chain 11 is guided between the forward run F and a return run R by end sprockets K mounted along and supported by a rotatable support shaft. The sprockets K are shown as being driven at one end by a motor M, which may be supported by the frame E. However, it is within the broadest aspects of the disclosure for the chain 11 to be driven in a continuous loop in a single (e.g., horizontal) plane, in which case the sprockets could be located anywhere along the path of conveyor travel. Alternatively, as discussed further below, the sprockets K could be arranged to rotate about a vertical axis and engage the side links 12 along an inner or outer side in order to drive the chain 11.

Figure 5:
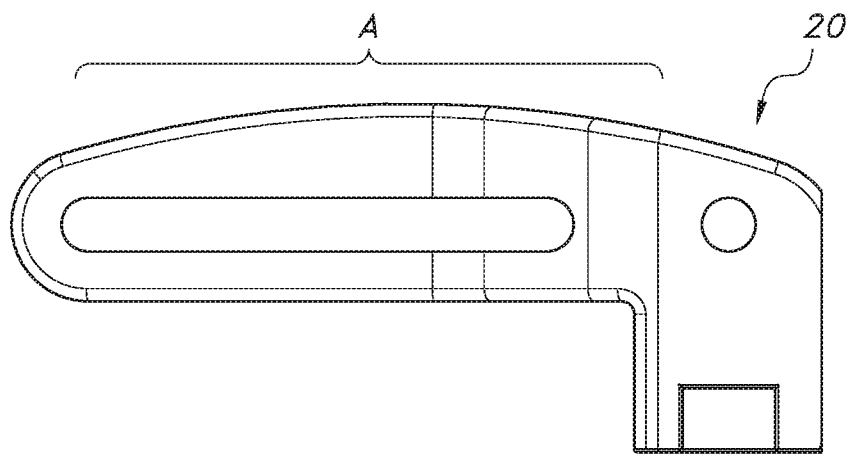
FIG. 5 is a side view of a link according to one aspect of the disclosure.
Figure 6:
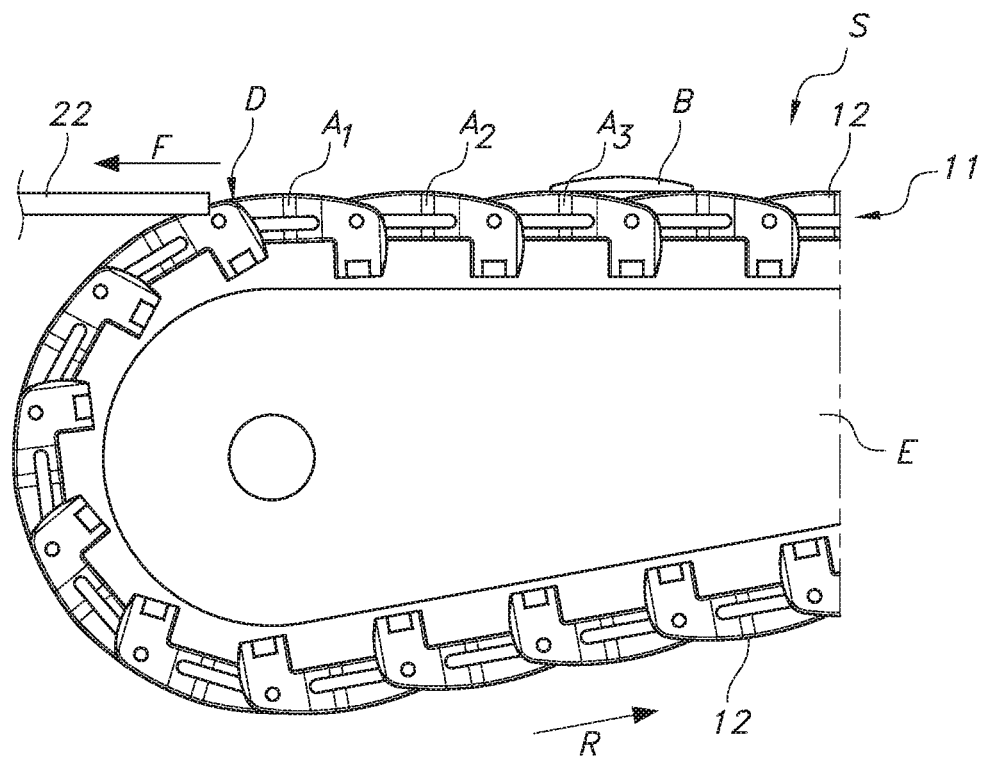
FIG. 6 is a side view of a chain formed on the links of FIG. 5 and being driven in an endless path.

Turning now to FIG. 5, one or more of the links 12 forming the chain 11 may be adapted in one of several ways to enhance the efficiency of the article conveyance. With reference to FIG. 6 as well, it can be understood that the illustrated link 12 is provided with an upper portion 20, which thus provides an apical region A for contacting and supporting an overlying article. The apical region A may be more in the nature of a plateau for supporting a corresponding portion of an article, rather than a single point, and may be rounded in nature (such as in the form of a spherical surface).

Consequently, when a plurality of the links 12 are arranged in tandem to form the endless chain 11 (which may comprise only a single link width in the direction transverse to the conveying direction) for conveying articles, the apical regions A1, A2, A3 (three identified for purposes of illustrative example only) of the consecutively arranged links 12 thus serve to provide an undulating conveying surface S for the article L being conveyed (which may be considered a smooth, gradually sloping surface with upper and lower regions formed on the same link 12). The conveying surface S may be continuous from the standpoint that it extends along the entire surface of the link 12, but discontinuous from the standpoint that it changes height in both the conveying direction and the transverse direction (and in one example such that the apical region A is substantially in the central portion of the conveying surface, but may also be provided along a forward or rearward portion of the link; see, e.g., FIG. 9).

As can be appreciated, this arrangement minimizes the amount of contact between the article L and the conveying surface S, which may help to facilitate cooling of the article. This may help to prevent deleterious sticking that may otherwise result, especially when the article is, for example, a food product exposed to freezing temperatures during conveyance. The minimal contact presented also tends to result in less friction, thus potentially making it easier to alter the path of conveyance, such as through lateral pushing, braking, or the like.

A further result of the upper portion 20 can be understood from the illustration of the transition from the forward run F to the return run R in FIG. 6. At this transition (or the transition from the return to the forward run at the opposite end), the curvature of the portion 20 of the consecutive links 12 is such that a substantially smooth depressed portion of the conveying surface is presented during travel along the rounded end section of the conveyor system 10 (such that the apical regions are aligned in the conveying direction among the row of links, as well as possibly in the transverse direction). This allows for a transfer T or like structure for transferring the article to an adjacent location (such as a downstream conveyor, not shown) to be positioned extremely close to the conveying surface along the transition without the usual concern for irregularities created by "flat top" links making the transition, which would result in a larger gap that could potentially snag the articles and not only cause damage to the article, but potentially lead to a catastrophic failure.

As should be appreciated, the portion 20 is shown as being applied to links 12 having the depending arm 14 for guiding the chain 11 along all or a portion of the endless path, but could also be applied to links without this structure (not shown).

Figure 7:
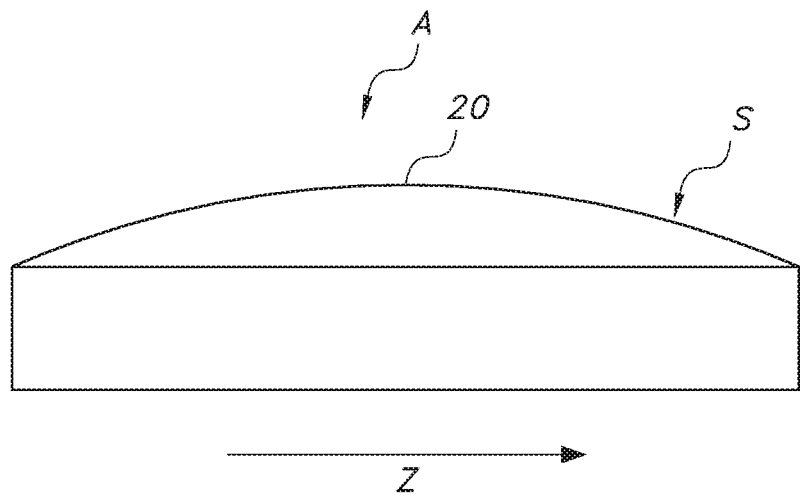
FIG. 7 is a side view illustrating the curved nature of the link surface in a transverse direction.

Turning to FIG. 7, it can also be understood that one or more of the links 12 may be provided with an upper surface that is sloped not only in the conveying direction, as shown in FIG. 5, but also in a direction Z transverse to the conveying direction (aligned with forward run F). As can be appreciated, this provides an apical region A with respect to both directions that further minimizes the amount of contact between the article L and the conveying surface S. This may further help to cool warm articles and prevent deleterious sticking that may otherwise result, especially when the article is, for example, a food product exposed to freezing temperatures during conveyance. The minimal contact presented also tends to result in less friction, thus potentially making it easier to alter the path of conveyance, such as through lateral pushing, braking, or the like.

Figure 8:
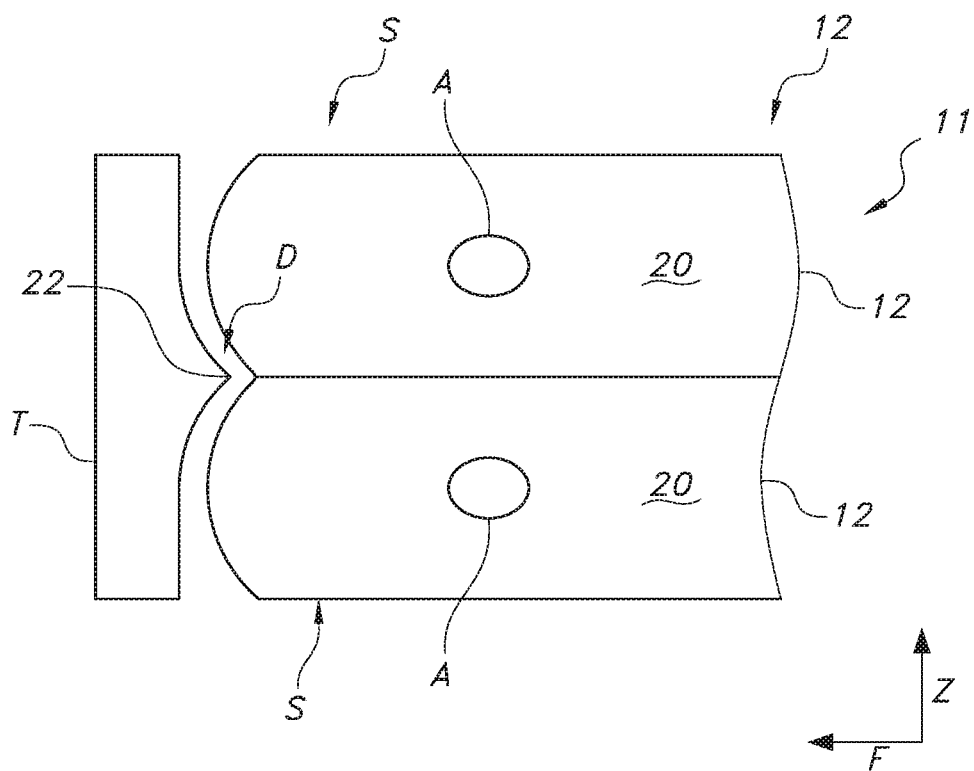
FIG. 8 is a top view illustrating two links forming an undulating conveying surface.

As can be appreciated, when two of such links 12 are adjacent to each other, such as when a chain 11 is formed, a valley or depressed region D is thus created between them (when the apical regions A are aligned in the transverse direction Z, for example). Thus, as shown in FIG. 8, which is a top view of the links 12 rounding from the forward F to the return R run, this allows for a projection 22, such as extending from a transfer T or the like, to pass into the resulting space as the chain 11 comprised of the links is traveling (spacing exaggerated for purposes of illustration). This finger-like projection 22 may be used to lift or scoop product supported by the apical region(s) A of the link(s) 12 onto the transfer in an extraordinarily smooth and efficient manner, and even with soft or small products. Use of this type of arrangement is shown in FIG. 6, with the projection 22 actually passing into the space D between adjacent links 12.

Figure 9:
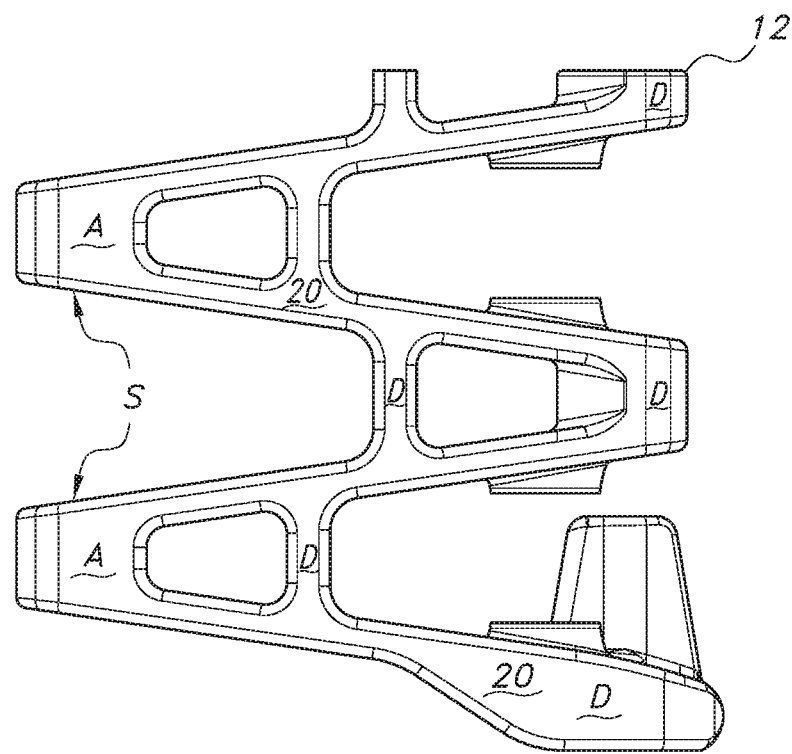
FIG. 9 illustrates a further embodiment of a link according to the disclosure.
Figure 10:
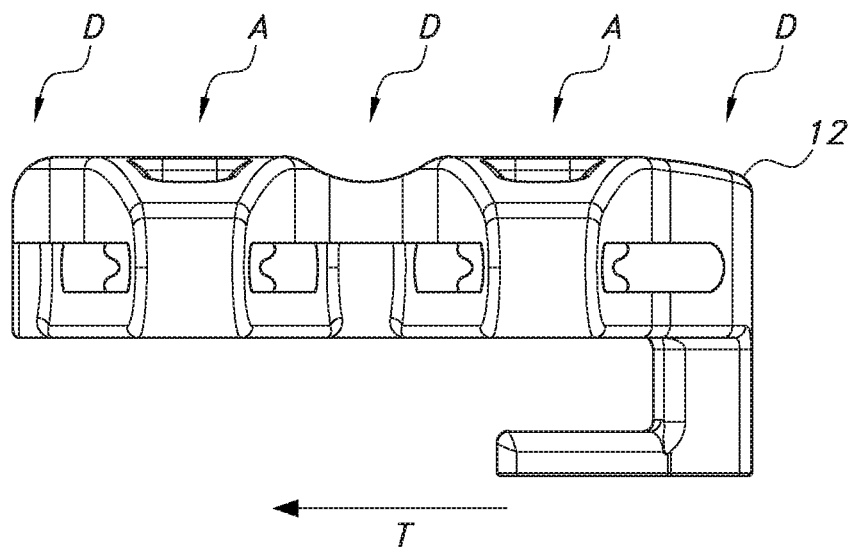
FIG. 10 is a front view of the link of FIG. 9.
Figure 11:
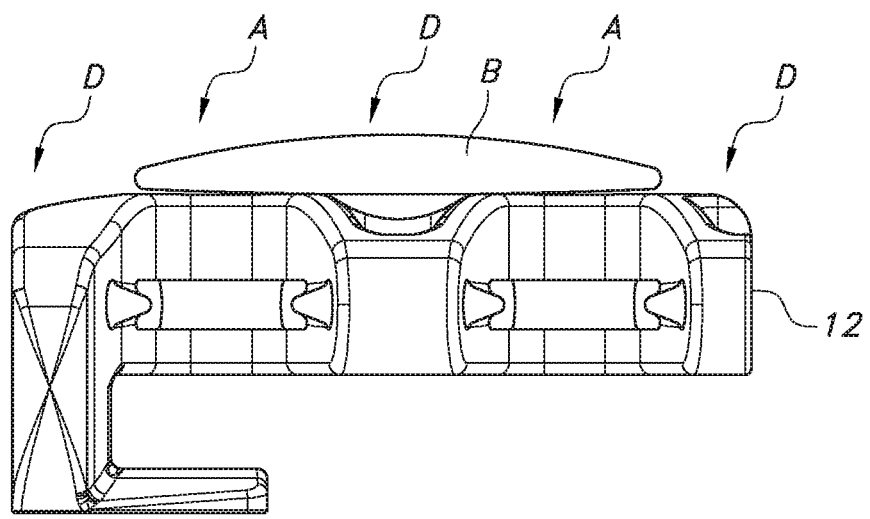
FIG. 11 is a rear view of the link of FIG. 9.

While the links 12 are shown in FIG. 8 as having a substantially continuous upper surface changing elevation in both the transverse and conveying directions, it should be appreciated that the same concept may be provided to links with discontinuous conveying surfaces (that is, with openings or open regions). Thus, as shown in FIGS. 9-11, the link 12 may have a first apical region A and a second, lower or recessed region D. The pattern may also repeat across the link 12 (or among links with upper portions of different elevations) to provide a surface that changes elevation repeatedly, or undulates, in the transverse direction Z. The pattern could also be reversed from what is shown. Further, while a depending arm and inwardly tab is shown for illustrating a side link, this is considered entirely optional.

Thus, as can be appreciated from FIG. 11, an article, such as a baked good B, may be supported by the apical regions A of two adjacent links in the transverse direction Z, as well as two different links 12 in the conveying direction D (see, e.g., FIG. 6). The apical regions A may also be staggered in the conveying direction D and/or the transverse direction (such as by combining links with a flat or planar surface with links having the apical regions A, such as in an alternating pattern (either in the conveying direction, the transverse direction, or both; see, e.g., apical regions A in FIG. 4). Thus, as can be appreciated from FIG. 4, two links with apical regions A may be interdigitated with a link without an apical region, or in any case having an uppermost surface U that is below the apical regions of the adjacent links. In this manner, a conveyor with an undulating conveying surface is provided.

The links 12 may be molded using conventional techniques out of durable materials typically used to form modular link conveyor chains 11 (e.g., plastic materials). The apical region(s) A may be directly molded into the link 12 as part of a homogeneous material forming the body of the link. The conveying surface S thus formed in thereby integral with the link 12, and forms a unitary part of it.

The foregoing description of several aspects of the embodiments disclosed herein is presented for purposes of illustration and description. The embodiments described are not intended to be exhaustive or to limit the invention to the precise form disclosed. Modifications or variations are possible in light of the above teachings. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for conveying an article in a conveying direction, comprising:
   a conveyor comprised of a plurality of rows of modular links, each of said rows including multiple modular links with said rows elongated in a direction transverse to the conveying direction, and one or more removable connectors for both interconnecting adjacent links in a row and interconnecting adjacent rows, at least one of the links comprising an upper link surface including a first upper region for contacting and supporting the article for conveyance along at least a forward run in the conveying direction and the upper link surface further including a second, lower region adjacent to the first upper region in a direction transverse to the conveying direction for not contacting the article.

2. The apparatus of claim 1, wherein the conveying surface includes a third region lower than the first, upper region and located in a transverse direction on a different side of the second, lower region.

3. The apparatus of claim 1, further including a projection positioned in a space between the first upper region and the second lower region.

4. The apparatus of claim 3, wherein the projection is connected to a transfer for transferring articles from the conveyor.

5. A conveyor link having:
   a body including a V-shaped configuration with a tip and a pair of legs, said legs extending in a conveying direction; and
   an upper link surface of the body that includes a first upper region for contacting and supporting an article for conveyance along at least a forward run in the conveying direction and the upper link surface further including a second, lower region adjacent to the first upper region in a direction transverse to the conveying direction for not contacting the article.

6. The link of claim 5, wherein the upper link surface includes a third region lower than the first, upper region and located in a transverse direction on a different side of the second, lower region.

7. An apparatus for conveying an article in a conveying direction, comprising:
   a conveyor comprised of a plurality of modular links and one or more removable connectors for interconnecting adjacent links to form a row of links, the plurality of interconnected links forming an undulating upper link surface adapted for contacting the article being conveyed, said upper link surface extending in a transverse direction along the row of links.

8. The apparatus of claim 7, wherein the links include apical regions aligned in the transverse direction for contacting and supporting the article for conveyance along at least a forward run in the conveying direction.

9. The apparatus of claim 7, wherein the upper link surface of the conveyor undulates in the conveying direction.

* * * * *